United States Patent [19]

Baek et al.

[11] Patent Number: 5,053,791

[45] Date of Patent: Oct. 1, 1991

[54] THERMAL TRANSFER PRINT MEDIUM DRUM SYSTEM

[75] Inventors: Seung Ho. Baek, Pittsford; Robert I. Morrison, Macedon; Sanwal P. Sarraf, Webster, all of N.Y.

[73] Assignee: Eastman Kodak Company, Rochester, N.Y.

[21] Appl. No.: 509,696

[22] Filed: Apr. 16, 1990

[51] Int. Cl.[5] .................. G01D 15/24; G01D 15/10; B65H 5/02

[52] U.S. Cl. .................. 346/138; 346/76 L; 346/76 PH

[58] Field of Search .................. 346/76 L, 76 PH, 138; 271/276

[56] References Cited

U.S. PATENT DOCUMENTS

| | | | |
|---|---|---|---|
| 2,366,935 | 1/1945 | Schmid | 51/235 |
| 3,630,424 | 12/1971 | Rau | 226/95 |
| 3,649,001 | 3/1972 | Schieven | 270/52 |
| 3,975,590 | 8/1976 | Nelson | 358/305 |
| 4,006,909 | 2/1977 | Ollendorf et al. | 279/3 |
| 4,245,003 | 1/1981 | Oransky et al. | 428/323 |
| 4,291,974 | 9/1981 | Silverberg | 355/76 |
| 4,496,955 | 1/1985 | Maeyama et al. | 346/76 PH |
| 4,772,582 | 9/1988 | DeBoer | 503/227 |
| 4,804,975 | 2/1989 | Yip | 346/76 L |

*Primary Examiner*—Benjamin R. Fuller
*Assistant Examiner*—Gerald E. Preston
*Attorney, Agent, or Firm*—Donald D. Schaper

[57] ABSTRACT

A holder for a thermal print medium is disclosed. The holder is adapted to be used in a thermal printer in which a donor element in a thermal print medium transfers dye to a receiver element upon receipt of a sufficient amount of thermal energy. The printer includes a plurality of diode lasers which can be individually modulated to supply energy to selected dots on the medium in accordance with an information signal. The print head of the printer includes a fiber optic array having a plurality of optical fibers coupled to the diode lasers. The holder for the thermal print medium includes a rotatable vacuum drum, and the fiber optic array is movable relative to the drum. The vacuum drum includes separate vacuum supplies for the donor sheet and for the receiver sheet so that the sheets can be independently handled.

12 Claims, 5 Drawing Sheets

THERMAL TRANSFER PRINT MEDIUM DRUM SYSTEM

CROSS REFERENCE TO RELATED APPLICATION

Reference is made to U.S. patent application, Ser. No. 451,656, entitled "Thermal Printer," filed in the name of Seung H. Baek et al. on Dec. 18, 1989; this application is assigned to the assignee of the present invention.

BACKGROUND OF THE INVENTION

1. Field of the Invention

This invention relates to a holder for a thermal print medium, and more particularly, to such a holder for use in a thermal printer which uses lasers to provide thermal energy to the print medium.

2. Description of the Prior Art

In one type of thermal printer, a dye-donor element is placed over a dye-receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known to use lasers instead of the resistors to provide the thermal energy in thermal dye transfer printing. In U.S. Pat. No. 4,804,975, for example, there is shown thermal dye transfer apparatus which comprises an array of diode lasers which can be selectively actuated to direct radiation onto a dye-carrying donor in a thermal print medium. The diode laser array extends the full width of the print medium, and radiation from the diode lasers is modulated in accordance with an information signal to form an image on a receiver sheet in the medium. A problem in apparatus of this type is in providing an intimate contact between the donor and receiver sheets during the image transfer process. It is known, as described in U.S. Pat. No. 4,245,003, to use a vacuum hold-down surface in combination with a porous receiver or receptor sheet. Vacuum applied through the porous receptor sheet is used to pull the donor sheet into contact with the receiver sheet. In many types of print medium, however, neither the donor nor the receiver is porous, and thus, the arrangement described in the patent does not solve the problem of insuring contact between the donor and the receiver sheets.

SUMMARY OF THE INVENTION

It is an object of the present invention to overcome the problems discussed above in the prior art and to provide an improved holder for a thermal print medium.

In accordance with one aspect of the invention, there is provided a holder for a thermal print medium, the medium being of a type in which a donor element transfers dye to a receiver element upon receipt of a sufficient amount of thermal energy, the holder comprising: a first support means for supporting a receiver element; a second support means for supporting a donor element; a first vacuum means for supplying a vacuum to the first support means; and a second vacuum means for supplying a vacuum to the second support means, the second vacuum means being operable independently of the first vacuum means.

In one embodiment of the present invention, a holder for a thermal print medium includes a rotatable drum which supports both a donor sheet and a receiver sheet of a thermal print medium. The receiver sheet is axially centered on the drum and is held thereon by means of a vacuum applied through ports in the drum shell. The donor sheet is placed over essentially the entire drum and is held in intimate contact with the receiver sheet by means of vacuum ports on the two axial ends of the drum and on an axially extending portion of the drum. The vacuum supply to the ports for the receiver sheet is independent of the vacuum supply for the donor sheet so that the donor sheet can be removed or installed without affecting the position of the receiver sheet.

The holder of the present invention can be used in a thermal printer in which a thermal print medium is supported on a rotatable drum, and a print head is movable relative to the drum by means of a motor-driven lead screw. The print head comprises a fiber optic array which is coupled to a plurality of diode lasers. Each of the diode lasers can be independently driven in accordance with an information signal. A lens supported on the print head is adapted to focus ends of optical fibers in the array on the print medium. The angle of the print head is adjustable in order to change the spacing between successive scan lines, and the speed of the drum can be changed to change the size of the dots, or pixels, produced on the medium.

A principal advantage of the present invention is that a donor sheet and a receiver sheet can be held in intimate contact during the printing process. Further, the donor and receiver sheets can be easily installed and removed from the drum, and the donor sheet can be installed and removed without affecting the position of the receiver sheet; this is an important element when a color print is being made in which three separate donor sheets must be brought into registration with the same receiver sheet.

Other features and advantages will become apparent upon reference to the following description of the preferred embodiment when read in light of the attached drawings.

DESCRIPTION OF THE PREFERRED EMBODIMENT

Figure 1:
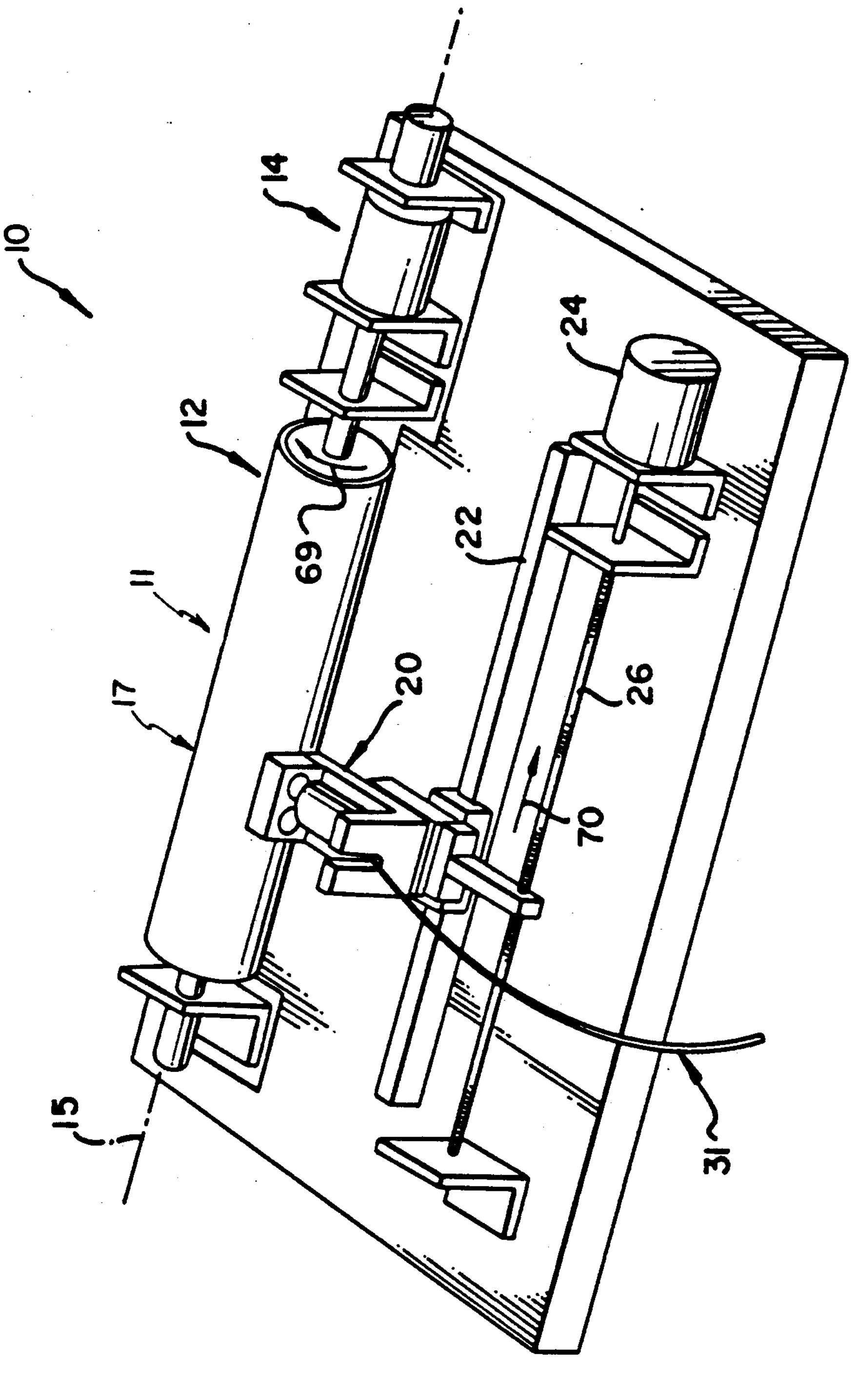
FIG. 1 is a perspective view of a thermal printer in which the present invention can be used.
Figure 2:
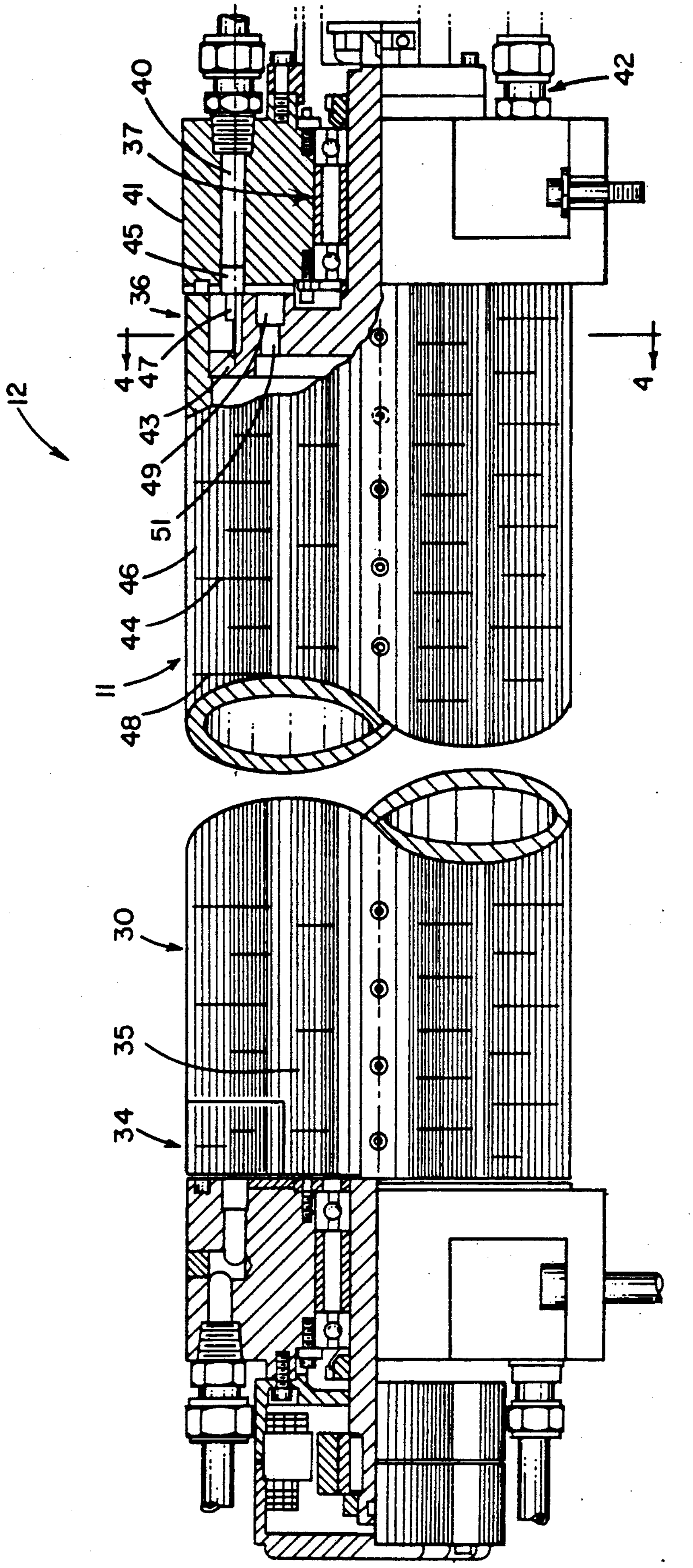
FIG. 2 is a front elevational view of the holder of the present invention, with certain parts shown in section.

With reference to FIG. 2, there is shown a holder 12 which is constructed in accordance with the present invention. Holder 12 can be used, for example, in a thermal printer of the type shown in FIG. 1 in which the holder 12 is shown schematically. As shown in FIG. 1, a thermal printer 10 comprises a holder 12 having a drum 11 which is rotatable about an axis 15 by means of a motor 14. Drum 11 is adapted to support a thermal print medium 17 of a type in which a dye is transferred by sublimation from a donor sheet 19 (FIG. 3) to a receiver sheet 21 as a result of heating the dye in the donor sheet. A thermal print medium for use with the printer 10 can be, for example, a medium disclosed in U.S. Pat. No. 4,772,582, entitled "Spacer Bead Layer for Dye-Donor Element Used in Laser Induced Thermal Dye Transfer," granted Sept. 20, 1988; this patent is assigned to the assignee of the present invention.

As disclosed in U.S. Pat. No. 4,772,582, the thermal print medium includes a donor sheet having a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye or it may be admixed with the dye. The laser beam is modulated by electronic signals, which are representative of the shape and color of the orignal image, so that each dye is heated to cause volatilization only in those areas in which its presence is required on the receiver sheet to reconstruct the color of the original object.

A print head 20 in printer 10 is movably supported adjacent drum 11 which is driven in the direction of arrow 69 by motor 14. Print head 20 is supported for slidable movement on a rail 22. The print head 20 is driven by means of a motor 24 which rotates a lead screw 26 to advance the print head in the direction of arrow 70. As the print head 20 is advanced, helical scan lines (not shown) are traced on the thermal print medium 17 supported on rotating drum 11. Print head 20 comprises a fiber optic array (not shown) in which optical fibers 31 are connected to a plurality of diode lasers (not shown). The diode lasers can be individually modulated to selectively direct light from the optical fibers onto the thermal print medium 17. A more complete description of the printer shown in FIG. 1 can be found in the aforementioned U.S. application, Ser. No. 451,656.

Figure 3:
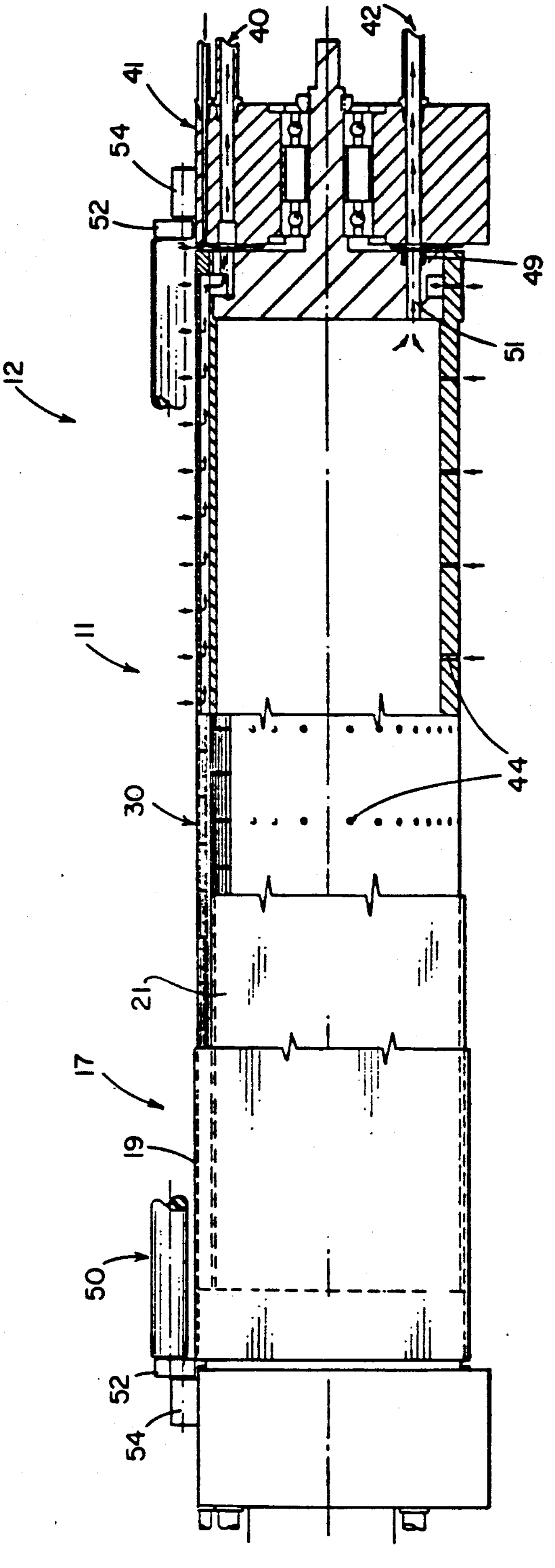
FIG. 3 is front elevational view of the holder, with parts shown in section, in which the drum has been rotated 90° with respect to the position of the drum shown in FIG. 2.
Figure 4:
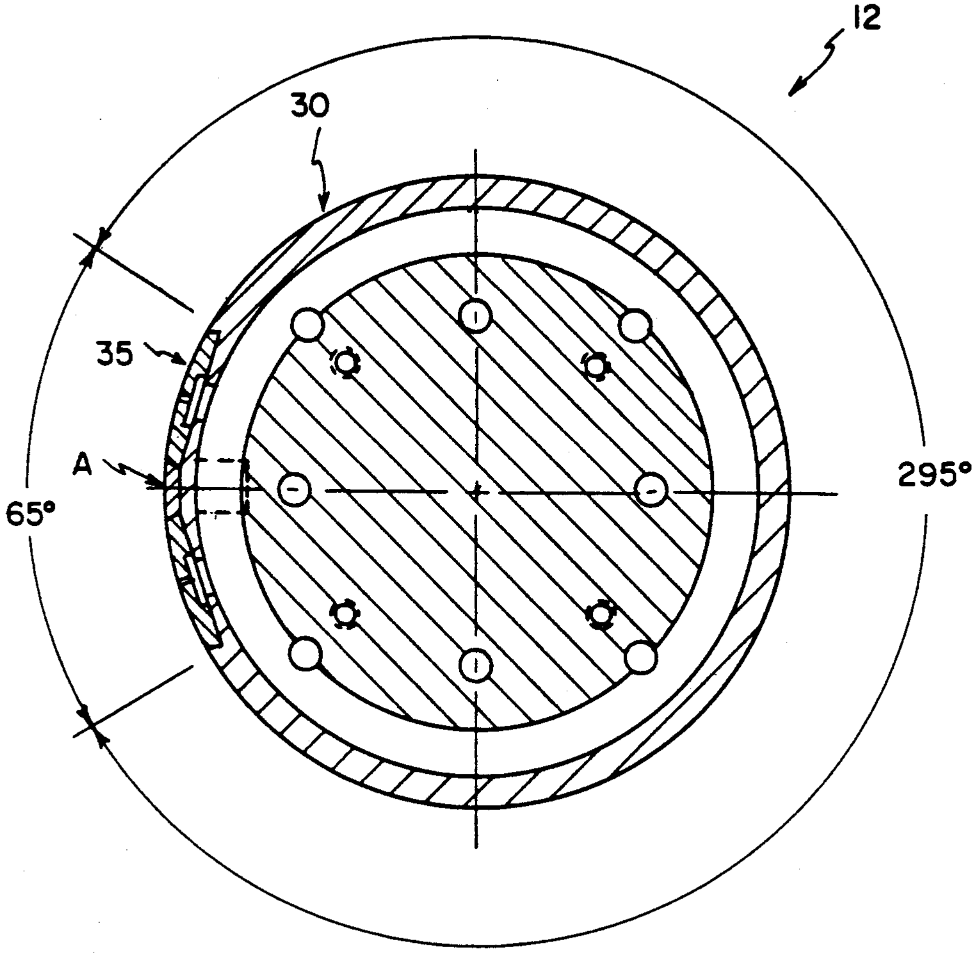
FIG. 4 is a sectional view taken along the line 4—4 in FIG. 2.

The holder 12 of the present invention is shown in detail in FIGS. 2–4. Drum 11 in holder 12 is a closed shell and includes a pattern of vacuum ports 44 over the surface thereof. Drum 11 includes a center section 30 which is adapted to support the receiver sheet 21. Center section 30 extends circumferentially around approximately 295° of the drum, as shown in FIG. 4, and center section 30 extends axially between end portions 34 and 36 of drum 11. The donor sheet 19 is supported on end portions 34 and 36 and on an axially-extending portion 35 which extends around approximately 65° of drum 11, as shown in FIG. 4. For a receiver sheet 21 which is, for example, 13×19 inches, and has a thickness of 0.004 inches, drum 11 can be about 5.00 inches in diameter. As shown in FIG. 2, the outside diameter of center section 30 is less than the outside diameter of end portions 34 and 36 so that when the receiver sheet 21 is installed thereon, a continuous surface will be presented to the donor sheet 19. Drum 11 is mounted for rotation in roller bearings, one of which is shown at 37 in FIG. 2. Bearings 37 are supported in bearing blocks 41. Drum 11 is spaced about 0.0003–0.0005 of an inch from each of the the bearing blocks 41 so that there is no interference between the drum 11 and the blocks 41. Any interference with rotation of the drum could affect the image produced on medium 17. The motor 14 for driving drum 11 can be an Inland Frameless motor, No. RBE 1801, which is adapted to rotate the drum at, for example, 1200 rpm.

A donor vacuum supply is connected to the portions 34–36 through a supply line 40 (FIG. 3), and a receiver vacuum supply is connected to the center section 30 through a supply line 42. The donor vacuum supply is controlled independently of the receiver vacuum supply, and thus, the donor sheet 19 can be removed without affecting the position of the receiver sheet 21. Vacuum can be supplied to the drum 11 by means of a vacuum pump, for example, a rotary vane vacuum pump, Model No. 5565, manufactured by Gast Manufacturing Co. In order to provide vacuum for holding the donor sheet 19 as drum 11 rotates, line 40 is in fluid communication with a circumferential groove 45 (FIG. 2) in bearing block 41, and groove 45 communicates with a series of holes 47 in end piece 43 of drum 11. The vacuum for holding the receiver sheet 21 is supplied through supply line 42 to a groove 49 in end piece 43; groove 49 is connected to the interior of drum 11 through holes 51 in the end piece 43.

Drum 11 comprises a pattern of vacuum ports 44 which extend to the drum surface. When a receiver sheet 21 is placed over the ports 44 in center section 30 and a vacuum is supplied to section 30, the receiver sheet 21 will be held against the surface of drum 11. Similarly, when a donor sheet 19 is placed over the ports 44 on portions 34–35 and a vacuum is applied to these portions, the donor sheet 19 will be pulled toward the surface of drum 11 and will be held in intimate contact with the receiver sheet 21. The ports 44 can be, for example, about 0.031 inches in diameter. Vacuum is spread over the entire surface of drum 11 by means of a system of closely-spaced, axially-extending grooves 46 and circumferentially-extending feed slots 48. Each of the grooves 46 extends into a feed slot 48 which includes one or more ports 44. The grooves 46 can be V-shaped grooves having a maximum width of about 0.010 inches and a depth of about 0.010 inches, and the feed slots 48 can be V-shaped and have a maximum width of about 0.020 inches and a depth of about 0.017 inches. A more complete description of a drum surface of the type described herein can be found in U.S. Pat. No. 3,630,4124, and the disclosure of this patent is expressly incorporated herein by reference.

A pressure roller 50, for use in mounting a donor sheet 19 over a receiver sheet 21, is supported in holder 12 as shown in FIG. 3. Roller 50 is rotatably mounted in mountings 52, and mountings 52 are pivotally mounted in supports 54 which are fixed to blocks 41. Roller 50 is biased out of contact with a donor sheet 19 by means of springs (not shown) which bear against mountings 52. Roller 50 is made of a resilient material, for example, 40 durometer silicon rubber. The roller 50 can be pivoted into contact with a donor sheet 34 during the installation of the donor sheet in holder 12 in order to insure that no pockets of air are trapped between the donor sheet 19 and the receiver sheet 21 and that close contact is maintained between the two sheets.

In the use of holder 12, a receiver sheet 21 would be placed on center section 30 and would be held thereon by a vacuum drawn through line 42. Receiver sheet 21 would extend around drum 11 except in the area of portion 35. Vacuum would then be supplied through supply line 40 to portions 34–36, and a donor sheet 19 would then be placed on drum 11. Starting at, for example, point A, shown in FIG. 4, the drum 11 would be rotated slowly while pressure roller 50 was being held against the sheet 19. When the donor sheet was completely wrapped around drum 11 and held in place by the vacuum in line 40, the pressure roller 50 would be rotated out of contact with the sheet 19; the printing process could then be started. When printer 10 is used to produce certain types of color prints, three separate donor sheets are used, one for each of the primary colors, to form an image on a receiver sheet. In this application, it is very important that the position of the receiver sheet on the drum remain the same during the entire process.

Figure 5:
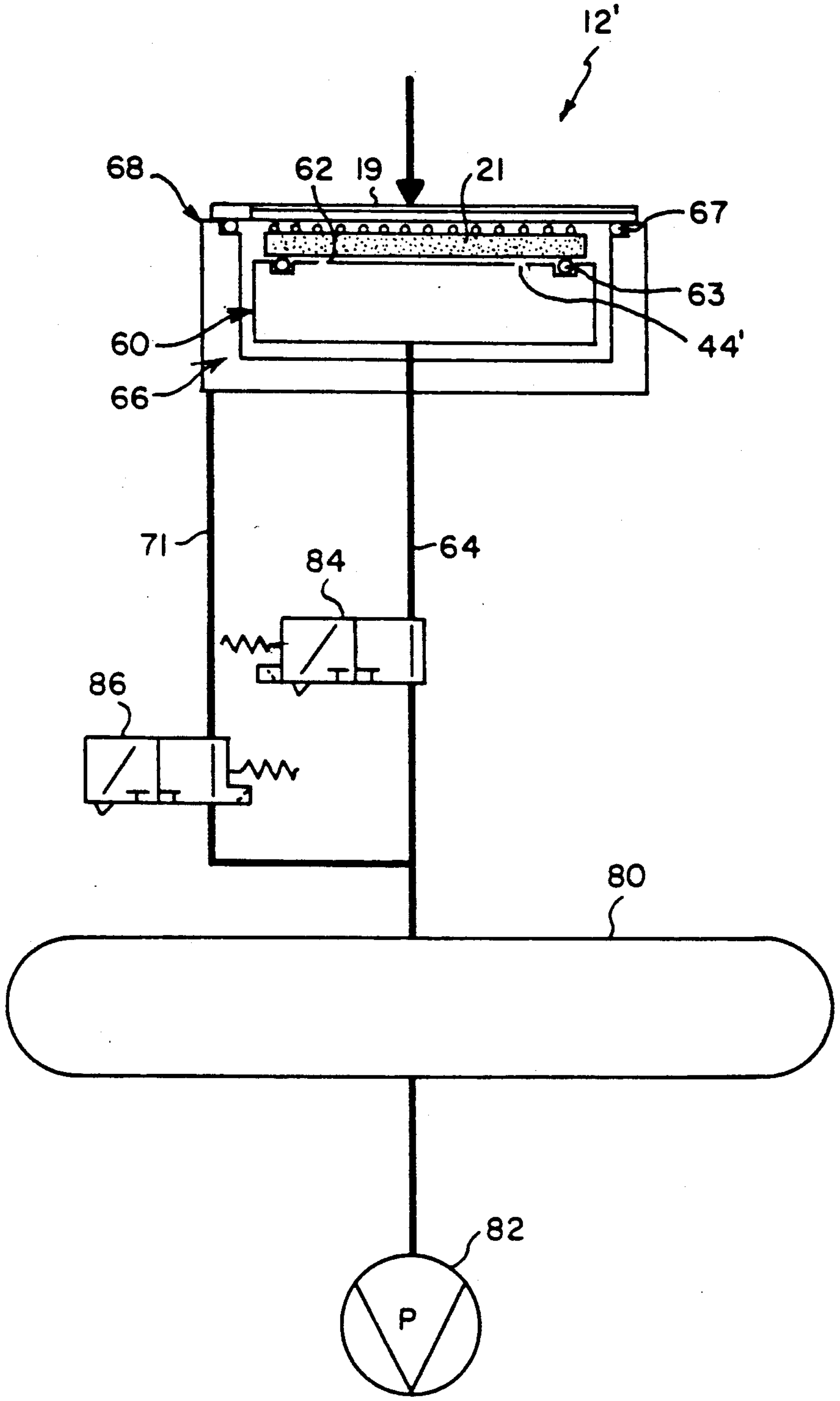
FIG. 5 is a schematic illustration of a second embodiment of the present invention.

With reference to FIG. 5, there is shown a second embodiment of the present invention. A holder 12' comprises a chamber 60 having a generally planar face 62 which includes vacuum ports 44' therein. A receiver sheet 21 is held against a seal 63 on face 62 by means of a vacuum which is supplied through a line 64. A second chamber 66, which surrounds chamber 60, has a planar face 68 which includes vacuum ports (not shown) and a seal 67. A donor sheet 19 is held against seal 67 and intimate contact with receiver sheet 21 by means of a vacuum on a line 71.

The vacuum for holder 12' is provided to lines 64 and 71 through a chamber 80 which is connected to a vacuum pump 82. Valves 84 and 86 provide independent control of the vacuum to the receiver sheet 21 and the donor sheet 19, respectively, so that the donor sheet 19 can be handled without affecting the position of the receiver sheet 21.

This invention has been described in detail with particular reference to the preferred embodiment thereof, but it will be understood that variations and modifications can be effected within the spirit and scope of the invention.

We claim:

1. A holder for a thermal print medium, said medium including a donor element which transfers dye to a receiver element upon receipt of a sufficient amount of thermal energy, said holder comprising:

a first support means for supporting the receiver element;

a second support means for supporting the donor element;

a first vacuum means for supplying a vacuum to said first support means; and a second vacuum means for supplying a vacuum to said second support means, said second vacuum means being operable independently of the first vacuum means.

2. A holder, as defined in claim 1, wherein said first and second support means are included on a cylindrical drum.

3. A holder, as defined in claim 2, wherein said first support means is on one axial portion of said drum, and said second support means is on a second axial portion of the drum.

4. A holder, as defined in claim 3, wherein said drum has a hollow interior, and said one axial portion has ports therein which communicate with said interior.

5. A holder, as defined in claim 4, wherein said holder includes a cylindrical roller which is pivotable into contact with the donor element on said drum.

6. A thermal printer for forming an image on a thermal print medium, said medium including a dye which is transferred by sublimation from a donor to a receiver as a result of heating dye in the donor, said printer comprising:

a source of radiation;

means for supporting the thermal print medium; said supporting means including a first support means for supporting said donor, a second support means for supporting said receiver, and vacuum means for supply vacuum to said first and second support means;

means for directing radiation from said source in a form of a dot on said thermal print medium in order to provide sufficient thermal energy to said donor to cause dye to transfer to the receiver; and means for moving said medium and said source relative to each other to form said image from a series of dots on said medium.

7. A thermal printer, as defined in claim 6, and further including means for controlling the speed of said moving means in order to control the size of said dots.

8. A thermal printer, as defined in claim 6, wherein said directing means includes a fiber optic array, and means for focusing ends of fibers in the array on said medium.

9. A thermal printer, as defined in claim 8, wherein said directing means includes means for supporting said array at an angle relative to scan lines traced on said medium.

10. A thermal printer, as defined in claim 8, wherein said array supporting means includes means for changing said angle to change a spacing between adjacent scan lines.

11. A thermal printer, as defined in claim 6, wherein said source includes a plurality of diode lasers.

12. A thermal printer, as defined in claim 6, wherein said first and second support means are included on a rotatable drum.

* * * * *